UNITED STATES PATENT OFFICE.

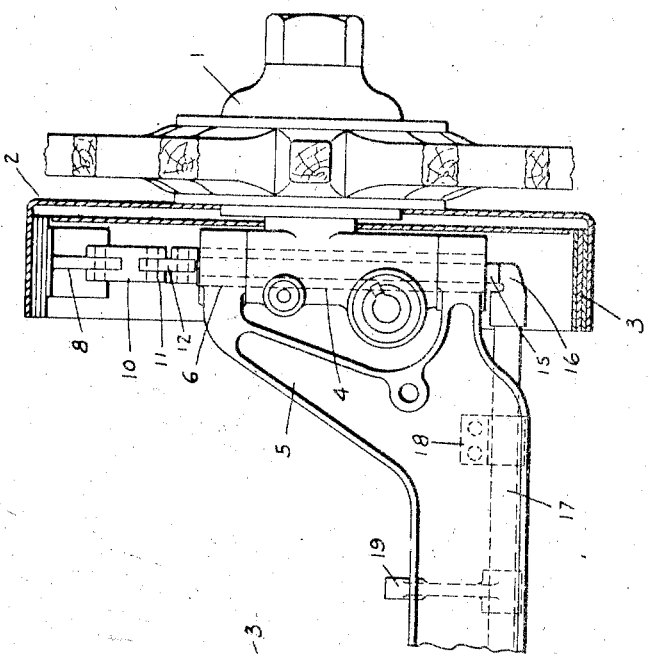
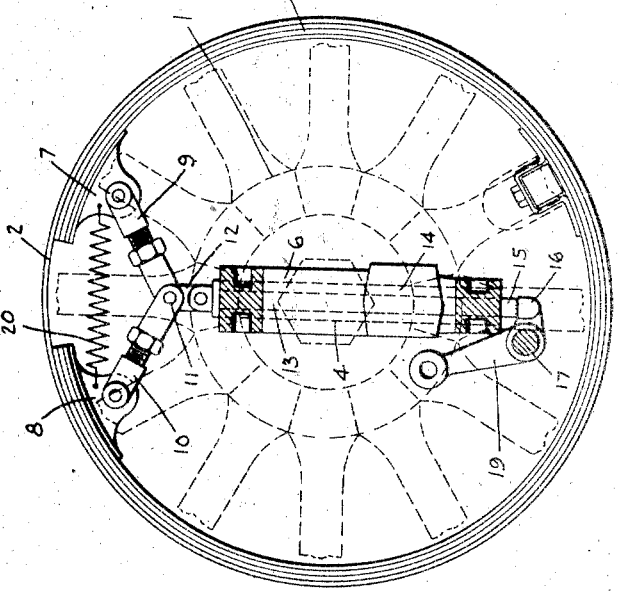

WILLIAM G. WALL, OF INDIANAPOLIS, INDIANA, ASSIGNOR TO NATIONAL MOTOR CAR & VEHICLE CORPORATION, OF INDIANAPOLIS, INDIANA, A CORPORATION OF NEW YORK.

BRAKE.

1,396,796.    Specification of Letters Patent.    Patented Nov. 15, 1921.

Application filed April 24, 1920. Serial No. 376,390.

*To all whom it may concern:*

Be it known that I, WILLIAM G. WALL, a citizen of the United States, residing at Indianapolis, in the county of Marion and State of Indiana, have invented certain new and useful Improvements in Brakes, of which the following is a specification.

This invention relates to means for operating brakes secured to the wheels of vehicles, such as motor cars, and is especially adapted to operate brakes secured to steered wheels, usually the front wheels of the vehicle, it being among the objects of this invention to produce a device capable of attachment to various types of motor car axles, which avoids the use of universal joints, which is capable of operating regardless of the angle to which the wheels are turned, which is simple in construction and positive in operation.

In carrying the objects of my invention into effect, I provide the usual brake drum which is secured to the wheel, and preferably place therein an internal expanding brake. The brake is provided with operating mechanism, usually consisting of links coöperating with a suitable member, such as a plunger, which is actuated by a cam member secured to the axle and capable of being operated from any desired point. Although I prefer to use an internal expanding brake it is to be understood that my invention may be adapted to various types of brakes in common use and also to various types of axles.

Referring to the accompanying drawings forming a part hereof, and in which similar reference characters denote similar parts, Figure 1 represents a partial interior view of a brake made in accordance with my invention and secured to the front wheel of a motor car, and Fig. 2, a side vertical section, some parts being shown in elevation, and some broken away.

The wheel 1 has secured thereto the ordinary brake drum 2 which carries an interior expanding brake 3. The wheel is secured by steering knuckle 4 to the steering yoke 5 of the ordinary axle by means of a hollow center king bolt 6.

To the free ends of the brake 3 are secured brackets 7 and 8 on which are pivoted links 9 and 10, preferably adjustable, the links being interconnected by pivot 11. The upper portion 12 of a plunger, or equivalent device, 13 is secured to said pivot 11 and extends through the opening 14 of the bolt 6. The lower end 15 of the plunger rests on cam 16 secured to shaft 17 which is held to the axle by yoke 18 and is capable of actuation by lever 19 placed at any convenient point and usually operated from the driver's seat. A spring 20 secured between brackets 7 and 8 is provided to contract the brake when in inoperative position and to produce pressure on the plunger against the cam.

The operation of the device is as follows:

When it is desired to put on the brakes, lever 19 is pushed forward oscillating shaft 17, causing cam 16 to move upward, pushing up the plunger 13, thus tending to straighten out the toggle formed by links 9 and 10 and expanding the brake against the brake drum. Due to the plunger being disposed centrally of the king pin 6, the end 15 thereof will always be in position directly above cam 16 no matter at what angle the wheels may be and thus the brake is always in position to be operated. Upon release of pressure on lever 19 the spring 20 contracts the brake releasing it and pushes the plunger 13 down placing the device in position to be again operated.

Although I have described a specific embodiment of my invention, it is to be understood that various changes may be made in the details and arrangement of parts within the scope of this invention.

Having thus fully described my said invention, what I claim as new and desire to secure by Letters Patent, is:

In combination, an axle having a yoke at its end, a steering knuckle coöperating therewith, a hollow bolt connecting the yoke and the knuckle, a brake drum, an expansible brake therein, a rod passing through the bolt, links connecting the bolt and the ends of the brake, said rod and links lying in the general plane of the brake drum, substantially as set forth.

In witness whereof, I have hereunto set my hand and seal at Indianapolis, Indiana, this 17th day of April, A. D. nineteen hundred and twenty.

WILLIAM G. WALL. [L. S.]

Witnesses:
H. C. BIERMAN,
HELEN J. BARTH.